United States Patent Office 3,538,176
Patented Nov. 3, 1970

3,538,176
PROCESS FOR THE PREPARATION OF AN ALKYLARYL COMPOUND
Herman S. Bloch, Skokie, Ill., assignor to Universal Oil Products Company, Des Plaines, Ill., a corporation of Delaware
No Drawing. Continuation-in-part of application Ser. No. 604,565, Dec. 27, 1966. This application June 17, 1969, Ser. No. 834,163
Int. Cl. C07c 3/00, 3/50
U.S. Cl. 260—671                                             11 Claims

ABSTRACT OF THE DISCLOSURE

A process for the preparation of an alkylaryl compound involving the dehydrogenation of a long-chain normal paraffin to produce the corresponding normal mono-olefin, and the use of the normal mono-olefin to alkylate an alkylatable aromatic, is improved by performing a condensation step on the effluent stream from the dehydrogenation step in order to remove therefrom undesired conjugated diolefins which are formed as a side-product in the dehydrogenation step. Points of improvement comprise: decrease in the rate of formation of a tar-like contaminant in the alkylation step, a decrease in the rate of deactivation in the alkylation catalyst utilized, a decrease in the amount of undesired side products formed in the alkylation step, and a substantial improvement in the yield of the desired alkylaryl compound.

CROSS-REFERENCES TO RELATED APPLICATIONS

This application is a continuation-in-part of my application entitled "Preparation of Normal Mono-Olefins" which was filed Dec. 27, 1966, and assigned Ser. No. 604,565, now U.S. Pat. 3,459,822 issued Aug. 5, 1969.

The present invention is concerned with an improvement in a process for the preparation of an alkylaryl hydrocarbon from an aromatic hydrocarbon and a normal paraffin having at least 9 carbon atoms per molecule.

In the main, the present invention is directed toward the resolution of a substantial contamination problem which almost inevitably attends production of a long-chain normal mono-olefin from a normal paraffin having the same number of carbon atoms. Essentially, this problem involves the undesired concomitant production of a diolefin having the same number of carbon atoms as the desired normal mono-olefin. As such this undesired diolefin tends to have physical properties quite close to those of the desired product, thus making physical separation extremely difficult. For instance, in a process for producing normal nonenes from normal nonane, some nonadienes will inevitably be produced; inasmuch as the boiling points of the nonadienes and of the nonenes overlap, it can be seen that separation by fractional distillation is not feasible. Furthermore, the magnitude of the problem intensifies as the number of carbon atoms increases in the homologues higher than normal nonane. In addition, the chemical characteristics of mono-olefins and diolefins are quite similar, and most ordinary reactions commonly used for separation by chemical means such as halogenation, hydration, esterification, carbonylation, etc., are entered into by both of these compounds. Accordingly, the elimination of the diolefin from the mixture of diolefins and mono-olefins without affecting the mono-olefins, is a difficult problem not readily amenable to conventional solutions. I have now found a method by which the major portion of this problem can be efficiently and effectively solved as will be hereinafter explained; but in order to understand the ramifications of the solution it is necessary to consider in detail how this problem typically arises and what significant improvements flow from its rectification.

Although extensive work has been done in the general area of production of mono-olefins from paraffins, the chief effort in the past has been primarily concentrated on lower molecular weight paraffins (i.e., 2 to 6 carbon atoms). Basically, this was caused by the ready availability of large quantities of these paraffins and, probably, the basic building-block nature of the product olefins. Recently, attention has been focused upon the problem of producing substantial quantities of longer chain olefins. In particular, a need was manifested for normal mono-olefins of 9 to 20 carbon atoms. This need was primarily a consequence of the growing commercial importance of the products that can be made from these normal mono-olefins.

As a consequence of this need, an extensive investigation has been launched into methods of preparation of these long-chain mono-olefins. At the moment the most promising method for their preparation appears to be via dehydrogenation of normal paraffins in contact with a suitable catalyst. Unfortunately, it appears that all suitable dehydrogenation processes produce some conjugated diolefins which can cause problems during subsequent processing of the mono-olefin as will be hereinafter discussed. In particular, a preferred dehydrogenation process, involving utilization of a catalytic composite comprising a combination of alumina, platinum, arsenic, and alkali or alkaline earth metals, can produce diolefins in an amount up to 30% by weight of the total olefinic products.

A consideration of the impact of the presence of these diolefins in the mono-olefins must necessarily involve a consideration of the potential uses of these long-chain normal mono-olefins. The principal area of use is in the synthesis of chemical products with particular economic emphasis on detergent products.

Typical products that are readily obtained by conventional means from these long-chain normal mono-olefins are: sulfonated detergents such as the alkali metal alkenylsulfonates, alkylsulfonates, and alkylarylsulfonates; nonionic detergents of both the alkoxypolyalkylene oxide type and the alkylphenoxypolyalkylene oxide type; sulfated detergents of the alkali metal alkylsulfate salt type; detergents of the aniline type such as the polyoxyalkylated alkylanilines; long-chain alcohols; polyesters; polyurethanes, plasticizers; synthetic lube oils; and the like.

In general, many of these products are manufactured from the normal mono-olefins by reactions which typically involve subjecting these mono-olefins to conditions under which it is possible, indeed, probable, that any contaminant diolefins will undergo side reactions such as polymerization to tar-like material. These side reactions typically cause substantial problems in these manufacturing reactions. For instance, in a process of particular commercial interest—one in which a biodegradable alkylaryl hydrocarbon having a straight chain alkyl group of 9 to 20 carbon atoms is prepared—the presence of diolefins in the olefinic charge to the alkylation step of the process necessarily causes the formation of a tar-like material because of the ease of polymerization of the diolefin relative to the mono-olefin. This tar-like material then deactivates the alkylation catalyst by forming tar-acid complexes. In a preferred process of this type in which the catalyst is an acid-acting fluid such as hydrogen fluoride, these diolefins enter the acid catalyst phase, polymerize, and effectively dilute the alkylation catalyst as well as reducing its activity by removing a portion of the catalyst in the form of a catalyst-hydrocarbon complex. Moreover, over a period of time this reaction product produced by diolefins can build to substantial levels and form the "acid sludge" that is the bane of this type of alkylation process. In addition, these diolefins can form undesired products such as alkylindanes, alkylindenes, diphenylalkanes, and the like which interfere with subsequent processing, cause substantial quality control problems, and detrimentally affect the yield structure of the desired product.

In short, the presence of these diolefins in the normal long-chain mono-olefins can cause substantial problems in subsequent synthesis work utilizing these hydrocarbons, and these problems flow primarily out of the fact that the diolefins more readily undergo side reactions than the monoolefins. However, not all diolefins have the same propensity to cause side reactions. In particular, of the three types of idolefins (i.e., cumulated, isolated, and conjugated) it is well known that the ones having the highest reactivity in these side reactions are conjugated diolefins. In fact, the conjugated diolefins typically constitute 50% to 90% of the diolefins formed during the aforementioned dehydrogenation step. The isolated diolefins do not respond in these side reactions much differently than the mono-olefins; and the cumulated diolefins (i.e., the allenes), possibly because they are highly unstable and readily undergo rearrangement, have not been identified in dehydrogenation product. Accordingly, the chief culprits in the previously mentioned side reactions are conjugated diolefins.

I have now found a method for eliminating these conjugated diolefins from the desired mono-olefins without affecting the normal mono-olefins. It essentially involves a condensation reaction which is selective for these conjugated diolefins and which forms a product, an adduct, which can be easily separated from the long-chain normal mono-olefins if desired.

It is, consequently, one object of the present invention to provide an improvement in a combination process for the production of an alkylaryl hydrocarbon, having an alkyl group of at least 9 carbon atoms, from a normal paraffin and an alkylatable aromatic hydrocarbon. A second object is to provide a method for reducing the rate of formation of a tar-like material in an alkylation reaction between a long-chain normal mono-olefin, which was prepared from corresponding normal paraffins in a dehydrogenation step, and an alkylatable aromatic. Another object is to provide a method of reducing the acid consumption in a hydrogen fluoride-catalyzed alkylation reaction between a long-chain normal mono-olefin, prepared from the corresponding normal paraffin in a dehydrogenation step and an aromatic compound.

In one embodiment, the present invention concerns an improvement in a combination process for the preparation of an alkylaryl compound having at least 9 carbon atoms in the alkyl side chain. In this process a normal paraffinic hydrocarbon containing at least 9 carbon atoms per molecule is subjected to a catalytic dehydrogenation step at dehydrogenation conditions selected to form a product stream containing unreacted normal paraffins, a normal mono-olefin having the same number of carbon atoms as said paraffinic hydrocarbon and a conjugated diolefin. Thereafter, the product stream from the dehydrogenation step and an alkylatable aromatic hydrocarbon are contacted, in an alkylation step, with an acid-acting alkylation catalyst at alkylation conditions selected to form the alkylaryl compound. In this process, the problem involves the conjugated diolefins formed as a side product in the dehydrogenation step. These cause the formation of a tar-like material in the alkylation step which material deactivates the acid-acting alkylation catalyst. The improvement of the present invention essentially involves contacting, in a condensation step, at least a portion of the product stream recovered from the dehydrogenation step with a dienophilic compound containing at least 3 carbon atoms per molecule at condensation conditions selected to produce an effluent stream containing the normal mono-olefin, the unreacted normal paraffins, and an adduct formed by a reaction between said conjugated diolefin and said dienophilic compound. Thereafter, at least the normal mono-olefin portion of the effluent stream from the condensation step is passed to the alkylation step, thereby substantially decreasing the rate of formation of the tar-like material in the alkylation step and prolonging the activity of the alkylation catalyst.

In a second embodiment, the present invention concerns the improved process as described in the first embodiment wherein the effluent stream recovered from the condensation step is, prior to passage of any portion thereof to the alkylation step, separated into an adduct-containing fraction and a normal mono-olefin-containing fraction. Thereafter, the normal mono-olefin-containing fraction is passed to the alkylation step.

In another embodiment, the improvement of the present invention involves the improved process as described in the first embodiment wherein the entire effluent stream from the condensation step is passed, after removal of unreacted dienophilic compound, to the alkylation step.

Other embodiments and objects of the present invention encompass: particular hydrocarbons that are to be dehydrogenated; characteristics of suitable dehydrogenation and alkylation catalysts, suitable conditions for performing the dehydrogenation, condensation, and alkylation steps; and particularly effective dienophilic compounds for the condensation step. These will be hereinafter described in a detailed discussion of each of these facets of the present invention.

As indicated, the present invention relates to a combination process essentially involving a dehydrogenation step, a condensation step, and an alkylation step.

With respect to this dehydrogenation step, suitable charge stocks are normal paraffins of at least 9 carbon atoms and especially 9 to about 20 carbon atoms. Representative members of this class are: nonane, decane, undecane, dodecane, tridecane, tetradecane, pentadecane, hexadecane, heptadecane, octadecane, mixtures thereof, and the like. Of particular significance to the present invention are normal paraffins of about 10 to about 15 carbon atoms since these easily produce mono-olefins which can be utilized to produce biodegradable detergents. Moreover, in some cases, it is advantageous to charge to the dehydrogenation step, a mixture of normal hydrocarbons such as the normal paraffin extract stream obtained when petroleum fractions in the $C_9$ to $C_{20}$ boiling range are subjected to a selective molecular sieve separation process.

Suitable catalysts for use in the dehydrogenation step of the present invention generally comprise one or more metallic components selected from Groups VI and VIII of the Periodic Table, and compounds thereof. Such catalysts are generally composited with a carrier material which usually consists of one or more refractory inorganic oxides selected from the group of alumina, silica, zirconia, magnesia, and the like. It is particularly important that the catalyst employed does not promote isomerization of the normal paraffins or of the resultant olefinic product. Accordingly, the catalyst utilized is preferably made non-acidic by compositing it with one or more alkali metals or alkaline earth metals. Furthermore, the conversion to the desired mono-olefin is enhanced when the noble metals of Group VIII are employed, with platinum being particularly preferred.

Insofar as degree of conversion and avoidance of side reactions are concerned, a particularly preferred catalyst for the dehydrogenation step comprises a combination of a platinum group metallic component, an alkali or alkaline earth metal component and a component selected from the group consisting of arsenic, antimony, bismuth, and compounds thereof, with an alumina carrier material.

The alumina carrier material generally has an apparent bulk density less than about 0.50 gram/cc. with a lower limit of about 0.15 gram/cc. The surface area characteristics are such that the average pore diameter is about 20 to about 300 angstroms; the pore volume is about 0.10 to about 1.0 milliliter per gram; and the surface area is about 100 to about 700 square meters per gram. It may be manufactured by any suitable method including the well known alumina sphere manufacturing procedure detailed in U.S. Pat. No. 2,620,314.

The alkali component of this preferred dehydrogenation catalyst is selected from both alkali metals—cesium, rubidium, potassium, sodium, and lithium—and the alkaline earth metals—calcium, magnesium, and strontium, with lithium being preferred. It is present in an amount, based on the elemental metal, less than about 5% by weight of the total composite with a value in the range of 0.01% to about 1.5% generally being most preferred. In addition, the alkali component may be added to the alumina carrier material in any suitable manner. Best results are obtained when it is added in an impregnation step with a suitable alkali or alkaline earth compound such as lithium nitrate. It may be added either before or after the other components are added or during alumina formation—for example, to the alumina hydrosol before the alumina carrier material is formed.

The Group VIII component is generally selected from the group of palladium, iridium, ruthenium, rhodium, osmium, and platinum—with platinum giving best results. It is used in a concentration, calculated as an elemental metal, of about 0.05% to about 5.0% by weight of the catalytic composite. This component may be composited in any suitable manner, with impregnation by a water-soluble compound, such as chloroplatinic acid, being especially preferred.

The fourth component of this preferred dehydrogenation catalyst is selected from the group consisting of arsenic, antimony, bismuth, and compounds thereof. Arsenic is particularly preferred. This component is present in an atomic ratio to the Group VIII metallic component of from about 0.1 to about 0.8. Intermediate concentrations are preferably employed such that the atomic ratio is about 0.2 to about 0.5. This component can be composited in any suitable manner—a particularly preferred way being via an impregnation solution containing a suitable compound such as arsenic pentaoxide, etc.

This preferred catalytic composite is thereafter typically subjected to conventional drying and calcination treatments at temperatures in the range of 800° F. to about 1100° F.

Although acceptable results are obtained when the dehydrogenation step is performed at a temperature in the range of about 400° C. to about 600° C., it is preferred to operate within the range of about 430° C. to about 530° C. Similarly, pressure can be within the range of about 10 p.s.i.g. to 100 p.s.i.g., with best results obtained in the range of about 15 to about 40 p.s.i.g. Likewise, a liquid hourly space velocity (LHSV—volume of equivalent liquid charge per hour per space volume of catalyst disposed within the reaction zone) of from above about 10 to about 40 is preferably utilized.

In some cases it may be advantageous to utilize a diluent, such as steam, methane, carbon dioxide, benzene, toluene, etc., in order to control the exothermic heat of reaction, or to adjust the partial pressure of hydrogen in the reaction zone, or to control carbonaceous deposits on the catalyst.

Although the presence of hydrogen in the dehydrogenation zone is not essential for all dehydrogenation catalysts and diluents previously mentioned, it is preferably present when the preferred catalyst is utilized in order to aid in controlling the rate of carbonaceous deposit formation on the catalyst. This hydrogen can be once-through hydrogen or recycle hydrogen. However, since the dehydrogenation reaction produces a surplus of hydrogen, it ordinarily is obtained by separating a hydrogen-rich gas from the effluent from the dehydrogenation zone and recycling it through compressive means to the dehydrogenation zone. Furthermore, this hydrogen is typically present in an amount such that the ratio of moles of hydrogen to moles of paraffin is about 1 to about 20 with the preferred value in the range of about 5 to about 15.

It is to be emphasized at this point that the effluent from the dehydrogenation zone when the preferred catalyst is employed can contain diolefins up to 30% by weight of the total olefinic product. As mentioned hereinbefore, of these approximately 75% by weight will be conjugated. Thus, it is evident that, with the preferred dehydrogenation catalyst, a substantial diolefin contamination problem can exist. And these results are typical of the situation encountered with other dehydrogenation catalysts.

In any event, at least a portion of the dehydrogenation effluent is, in accordance with the present invention, passed to a condensation zone. In this zone the condensation step of the process is performed by contacting the effluent stream with a dienophilic compound at adduct formation conditions.

Suitable dienophiles for use in the present invention are mono-olefins having from 3 to 6 carbon atoms per molecule. Although these olefins may be unsubstituted they are particularly effective when their double bond is conjugated with at least one strongly electron-attracting group such as: the carbonyl group, the carboxylic group, the cyano group, etc. Examples of these dienophiles are: maleic anhydride, acrolein, cinnamaldehyde, crotonic acid, cinnamic acid, acrylic acid, acrylonitrile, crotonaldehyde, tetracyano ethylene, dimethylmaleate, quinone, etc. On the other hand, the unsubstituted olefins—such as propylene, butylene, etc.—even though they are not as active, will react and are very attractive because of economic considerations.

The dienophilic compound may be present in any suitable concentration effecting adduct formation with substantially all of the conjugated diolefins. It is preferred to utilize the dienophilic compound in an amount sufficiently greater than the minimum stoichiometric amount so that the reaction is forced to go substantially to completion. In the case of relatively slow reacting dienophiles, such as propylene, it is thus preferred to utilize the dienophilic compound in an amount greater than 5 or more times the minimum stoichiometric amount. On the other hand, with more rapidly reacting dienophiles, such as maleic anhydride, the excess over the stoichiometric amount is generally much smaller. In any event, the excess dienophilic compound can be recovered and recycled to the condensation zone by conventional means.

Suitable reaction conditions for this condensation step are: a temperature in the range of about 25° C. to about 200° C., a pressure such that the major portion of the reactants are in the liquid phase—that is to say, from about atmospheric up to about 75 atmospheres or more, and a residence time of the diolefins in the condensation zone of from about 1 to about 30 hours. Moreover, it is important to note that the condensation reaction does not require a catalyst.

In view of the fact that the resultant adduct contains at least 3 more carbon atoms and is a cyclo-olefinic compound, it can, if desired, be easily separated from the effluent stream from the condensation step. One suitable method, if polar dienophiles are used, is solvent extraction since the cyclo-olefinic adducts are selectively dissolved from a mixture with the paraffins and mono-olefins by solvents such as the oxynitriles, the glycols, the phenols, and other polar selective solvents. A preferred method of separation, particularly with substituted dienophiles, is fractional distillation. It is to be noted that in some cases (for example, if the dienophile is propylene) it is not necessary to separate the resultant adducts from the condensation zone effluent, because the adducts do not ordinarily cause the polymerization problem previously mentioned during subsequent processing. This is particularly true if the subsequent process it as a temperature substantially less than that employed in the condensation zone. Accordingly, in one embodiment the entire effluent stream from the condensation step is passed directly to the alkylation step after the removal of excess dienophile.

In some situations, particularly when employing an expensive dienophilic compound, it may be desirable after separation of the condensation zone effluent to subject the adduct-containing portion to conditions designed to reverse the adduct-formation reaction and, thus, allow the recovery and recycling of the dienophilic compound. The chief condition promoting this reverse reaction is higher temperature; and when the adduct-containing portion of the effluent from the condensation step is subjected to a temperature significantly above that employed in the condensation zone, the condensation reaction tends to reverse. Likewise, it is important that any procedure employed to separate the adduct from the normal mono-olefin be conducted at a temperature no greater than that employed in the condensation zone. For some hydrocarbon mixtures this last requirements may require separation techniques, such as vacuum distillation, that are familiar to those skilled in the art.

It is to be observed that if recovery of the dienophilic compound is undertaken, there will also be available substantial quantities of relatively pure conjugated diolefinic hydrocarbons as a side product of the recovery operation. These may be utilized for any purpose in which relatively high molecular weight hydrocarbons containing conjugated unsaturation are desired. For example, these compounds are useful in the preparation of drying oils which may be incorporated in the manufacture of paints and varnishes in which unsaturated glyceride oils are now employed.

It is to be noted that the effluent from the condensation zone, either before or after the adduct separation step, is realtively free of conjugated diolefins (i.e., relative to the input stream to the condensation zone) and is, accordingly, referred to herein as a relatively conjugated diolefin-free normal mono-olefin stream. In point of fact, depending on the particular dienophilic compound chosen, it will have been reduced in conjugated diolefin content by about 75% to 95% of the conjugated diolefins originally present in the input stream to the condensation zone.

Considering the fact that unreacted paraffin hydrocarbons are relatively inert to the conditions under which the mono-olefins will subsequently be utilized, it is generally not necessary to separate them from the desired mono-olefin. On the other hand, in some cases it may be necessary to have a concentrated mono-olefin stream available. In this latter situation, the unreacted paraffins can be separated from the normal mono-olefins, either before or after the condensation step of the present invention, by methods well known in the art such as selective adsorption on activated charcoal, silica gel, alumina, molecular sieves, etc., or absorption in a chelating reagent such as ammoniacal cuprous salt solution.

In any event, in an embodiment in which the present invention manifests a particularly significant advantage (i.e., it promotes process stability by reducing the formation of acid sludge or of a tar-like carbonaceous deposit), the relatively conjugated diolefin-free normal mono-olefin stream is charged with an alkylatable aromatic hydrocarbon to an alkylation zone. As pointed out hereinbefore, this mono-olefin stream may be one that is reasonably free of any unreacted paraffin from the dehydrogenation zone; but it is preferred to utilize the mono-olefin with the unreacted paraffin since the latter acts as an inert diluent which is useful for heat control purposes in the exothermic alkylation reaction. Furthermore, since the alkylation reaction converts olefins into higher boiling substances it, in effect, can be thought of as a means of quickly and efficiently performing the desired separation. These paraffins are, consequently, easily separated from the alkylate and recycled to the dehydrogenation zone, if desired, after suitable treatment to insure that the acidity of the paraffin stream is reduced to very low levels. The term "acidity" referred to herein is any material such as combined halogen, combined oxides of sulfur, etc., which might be present in the effluent from the alkylation zone and be acid-acting in the dehydrogenation zone.

Of the aromatic hydrocarbons suitable for use in the alkylation reaction with the normal mono-olefin, I prefer to utilize a mono-cyclic benzene hydrocarbon containing no more than two alkyl substituents. Preferably, neither of the alkyl groups is of greater chain length than the ethyl radical. Hence, benzene toluene, xylenes, methylethylbenzenes, and diethylbenzenes are preferred aromatics for use in the alkylation zone. Moreover, in some cases it may be desirable to utilize phenol, cresol, acetanilide, etc. Thus, any alkylatable aromatic compound containing a substitutable hydrogen atom on a benzene nucleus may be used if desired.

In the alkylation step of the present invention, the aromatic compound and the relatively conjugated diolefin-free mono-olefin stream may be introduced simultaneously or in admixture with each other into the alkylation zone containing the desired alkylation catalyst; alternatively, the aromatic compound may be contacted with the alkylation catalyst followed by the addition of the mono-olefin thereto. The molecular proportion of aromatic compound to mono-olefin is generally maintained above equimolecular ratio, preferably from about 2 to 1 to about 30 to 1 in order to minimize polyalkylation of the aromatic compound and polymerization of the olefin. Moreover, the feed stream will most likely be cooled to meet desired temperatures as mentioned hereinafter.

Any suitable alkylation catalyst may be utilized to effect the desired reaction. Representative of these are: sulfuric acid of at least 85% concentration and preferably higher; susbtantially anhydrous hydrogen fluoride, generally not containing more than 10% water; anhydrous aluminum chloride or aluminum bromide, preferably in the presence of the corresponding hydrogen halide; boron trifluoride either with or without addition of hydrogen fluoride, and either as such or adsorbed on a solid support, such as a boron trifluoride-modified inorganic base; phosphoric acid which is generally deposited on a carrier material such as kieselguhr, hydrated silica, etc.; and the like. The preferred catalyst for the present invention is hydrogen fluoride of about 90% concentration or higher; another preferred catalyst is the previously mentioned boron trifluoride.

Details as to concentration, method of use, etc., of these preferred alkylation catalysts will be found in the teachings of U.S. Pat. No. 3,249,650 insofar as the hydrogen fluoride catalyst is concerned, and in the teachings of U.S. Pat. No. 3,200,163 for the boron trifluoride catalyst.

In the alkylation zone, the reactants are maintained in contact with the alkylation catalyst for a reaction period of about 5 to about 100 minutes, the exact contact time being dependent on the relative ease of alklating the reactants. The temperature maintained in this zone is within the range of about 0° C. to about 100° C. and preferably from about 15° C. to about 75° C. Likewise, superatmospheric pressure sufficient to maintain the catalyst and hydrocarbon in liquid phase are generally employed.

Following the alkylation reaction, the alkylation zone effluent stream is generally separated by a fractionating system in order to obtain the desired alkylaryl hydrocarbon. In a representative case of particular interest in which the alkylation catalyst is a solution of hydrogen fluoride, the effluent stream from the alkylation step is passed to a separating zone in which an acid phase separates from a hydrocarbon phase. The hydrocarbon phase is then washed with acid and stripped of hydrogen fluoride. The hydrogen fluoride-free hydrocarbon phase is thereafter charged to a fractionating system in order to recover the molar excess of unreacted aromatic hydrocarbon and to separate out the paraffin diluent that, in one preferred embodiment, is present due to the charging of both the unconverted paraffins and mono-olefins from the dehydrogenation step. Ordinarily, the recovered unreacted aromatic hydrocarbon will be recirculated to the alkylation step and the recovered paraffin will be recycled to the dehydrogenation step after suitable treatment to remove acid-acting components. The desired product stream is generally recovered as an overhead fraction from this fractionating system and is, either before or after recovery, passed through suitable defluorination equipment such as calcined bauxite bed in order to remove any combined fluoride.

The acid phase from this separating zone ordinarily contains a complex mixture of hydrocarbons and hydrofluoric acid known in the art as "acid sludge." This, as previously mentioned, is at least in part the result of the presence of conjugated diolefins that enter the catalyst phase, polymerize, and effectively dilute the alkylation catalyst as well as reduce its activity by removing a portion of the catalyst in the form of a catalyst-hydrocarbon complex. The formation of this sludge requires frequent addition of fresh catalyst to the alkylation zone and frequent regeneration of the catalyst to remove this sludge before the catalyst phase is recycled to the reactor. Accordingly, it is a feature of the present invention that the formation of this sludge is minimized, consequent acid consumption is lower, and regeneration requirements are substantially reduced.

The following examples are introduced to illustrate further the novelty, mode of operation, and utility of the present invention, and the benefits to be derived through the utilization thereof. It is not intended to limit unduly the present invention to the flow scheme, specific process conditions, types of catalyst, and composition of catalyst used therein since they are intended to be illustrative rather than restrictive.

EXAMPLE I

This example demonstrates the capability of the present invention to produce a relatively conjugated diolefin-free mono-olefin stream from a normal paraffin feed stock.

The working embodiment of the present invention utilized in this example consists of a dehydrogenation zone in which is employed the hereinbefore described preferred dehydrogenation catalyst, coupled with a condensation zone in which propylene is utilized to remove undesired conjugated diolefins generated in the dehydrogenation zone.

The catalytic composition, employed in the dehydrogenation zone, is disposed in a stainless-steel tube and is buffered by a zone of alpha-alumina particles placed on the input side of the reaction. The heat of reaction is supplied by an inner spiral preheater located in the input line to the reactor section. The catalyst employed in the reactor zone is manufactured from a commercially available alumina carrier material by impregnating it with chloroplatinic acid and lithium nitrate at conditions effecting the incorporation of 0.75% by weight of platinum and of 0.50% by weight of lithium (n.b. both of these calculated on an elemental basis). Thereafter, an ammoniacal solution of arsenic pentoxide is utilized to impregnate arsenic in a manner incorporating 0.3 atom of arsenic for each atom of platinum. The resultant composite is then dried at a temperature of about 210° F. and calcined in an air atmosphere for approximately two hours at a temperature of about 1000° F.

A charge stock containing 99.9% by weight of normal dodecane is charged to the dehydrogenation zone in admixture with recycle hydrogen. The effluent stream from the dehydrogenation zone passes through cooling means to a separating zone. Here a hydrogen-rich gas phase separates from a liquid phase and it is recycled through compressive means to the inlet to the dehydrogenation zone. The liquid phase is thereafter passed to a condensation zone wherein it is contacted with a propylene-rich gas stream. The liquid effluent stream from the condensation zone is passed to a vacuum fractionating zone from which a relatively diolefin-free normal dodecene-dodecane fraction is taken overhead and an adduct-containing bottoms fraction is recovered.

Operating conditions employed in this process are: (1) for the dehydrogenation zone, an LHSV of 32, a ratio of moles of hydrogen to moles of dodecane of 8:1, an inlet pressure of 22 p.s.i.g., and an inlet temperature of 465° C.; and, (2) for the condensation zone, a temperature of 200° C., a pressure such that the $C_{12}$ portion of the charge stays substantially liquid and a high concentration of propylene is maintained (i.e., approximately 60 atmospheres), a contact time of about 10 hours, and a ratio of moles of propylene to moles of conjugated diolefin of about 15.

An analysis of the liquid effluent stream from the dehydrogenation zone shows the following composition: 88.2% by weight unreacted normal dodecane, 10.7% by weight of normal dodecenes, 0.5% by weight of normal dodecadienes, and 0.6% of aromatics and other products. This implies that the selectivity for the desired mono-olefin is 91% and the corresponding diolefin production is 4.5% of the total olefinic product. The diolefins are approximately 75% by weight conjugated.

An analysis of the overhead fraction from the vacuum distillation column is also made. It shows that the dodecadiene concentration is reduced to a level of less than 1.4% which corresponds to a reduction in the diolefin concentration in the total olefinic product of approximately 70%. Moreover, this analysis shows that of the remaining diolefins only about 20% are conjugated diolefins.

Hence, this example manifests the significant reduction of diolefin content that is achieved by the present invention through the use of a preferred dehydrogenation catalyst coupled with a conjugated diolefin elimination procedure.

EXAMPLE II

This example indicates the improvement that attends employment of the present invention in an alkylation embodiment.

Two separate cases are considered here. The first, Case A, involves a dehydrogenation zone and hydrogen separating zone, substantially as described in Example I, with the liquid effluent stream from the hydrogen separating zone directly flowing through cooling means to an alkylation zone. This flow scheme represents prior art process in which no direct attempt is made to control conjugated diolefin concentration in the feed stream to the alkylation zone. The second, Case B, involves the total flow scheme as described in Example I with the relatively conjugated diolefin-free mono-olefin stream that is taken overhead from the vacuum distillation zone being fed through suitable cooling means to the alkylation zone.

The feed to the dehydrogenation zone and the operation of the dehydrogenation zone are the same for both cases and are as given in Example I. Furthermore, the alkylation zone in both cases is operated in exactly the same manner. That is to say, the olefin-containing stream is in both cases admixed with a benzene stream in such a proportion that the ratio of moles of benzene to moles of olefin contained in the olefinic charge stream is 10. In addition, anhydrous hydrogen fluoride is introduced into the alkylation zone in an amount such that the volumetric ratio of catalyst to hydrocarbon entering the alkylation zone is about 1.5. The alkylation zone is operated at a temperature of 100° F., a pressure of 250 p.s.i.g., and a space time (i.e., defined as the time of contact of the hydrocarbon with the catalyst in the alkylation reactor—it is usually calculated on the basis of the total volume of catalyst in the reactor divided by the volume rate of hydrocarbon charge) of 15 minutes. The reactor is also provided with suitable cooling means to remove the exothermic heat of reaction and to maintain the desired temperature.

The alkylation zone effluent stream is then passed to a separating zone in which an acid phase separates from a hydrocarbon phase. At least a portion of the acid phase from the separator is passed to an acid regenerator which is a small distillation column. It is operated with a low amount of reflux and at a pressure of approximately 150 p.s.i.g. Taken overhead from this regenerator column is a hydrogen fluoride stream which is recirculated to the process. A tar-like acid sludge material is recovered as bottoms. As explained hereinbefore this acid sludge is, at least in part, the result of polymerization of conjugated diolefins in the feed and the formation of a catalyst-hydrocarbon complex. This acid sludge formation results in an increase in the amount of alkylation catalyst converted to spent catalyst sludge.

Referring back to the hydrocarbon phase separated from the alkylation zone effluent stream, it is subsequently heated and charged in succession to an acid wash column and a hydrogen fluoride stripper. The overhead vapor stream from the stripper is recirculated to the alkylation zone. The bottoms stream from the stripper is then charged to a fractionation system from which unreacted normal benzene, dodecane, and dodecylbenzene streams are obtained.

The quantity of acid in the system is maintained at a constant level, and the rate at which the acid is replenished forms a measure of the rate at which the undesired acid sludge is being formed. In Case A, it is necessary to regenerate the catalyst at a rate which is three times greater than for Case B. Further, the rate of addition of fresh make-up acid (chiefly to replenish that lost during regeneration) is about in the same ratio. That is to say, Case A requires approximately 0.3 pound of fresh hydrogen fluoride per barrel of alkylate product, whereas Case B requires about 0.1 pound of hydrogen fluoride on the same basis. Furthermore, the yield structure for Case B, as well as benzene consumption, is improved over Case A inasmuch as the yield of undesired products such as diphenyldodecanes is greatly reduced.

I claim as my invention:

1. In a process for the preparation of an alkylaryl compound having at least 9 carbon atoms in the alkyl side chain wherein a normal paraffinic hydrocarbon containing at least 9 carbon atoms per molecule is subjected to a catalytic dehydrogenation step at dehydrogenation conditions selected to form a product stream containing unreacted normal paraffins, a normal mono-olefin having the same number of carbon atoms as said normal paraffinic hydrocarbon, and a conjugated diolefin; wherein this product stream and an alkylatable aromatic hydrocarbon are contacted, in an alkylation step, with an acid-acting alkylation catalyst at alkylation conditions selected to form the alkylaryl compound, and wherein the conjugated diolefin formed in the dehydrogenation step causes the formation of a tar-like material in the alkylation step which material deactivates the acid-acting alkylation catalyst, the improvement comprising: contacting, in a condensation step, at least a portion of said product stream from the dehydrogenation step with a dienophilic compound containing at least 3 carbon atoms per molecule at condensation conditions selected to produce an effluent stream containing said normal monoolefin, said unreacted normal paraffins, and an adduct formed by a reaction between said conjugated diolefin and said dienophilic compound and thereafter passing to the alkylation step at least the normal mono-olefin portion of the effluent stream from the condensation step, thereby substantially decreasing the rate of formation of the tar-like material in the alkylation step and prolonging the activity of the alkylation catalyst.

2. An improved process as defined in claim 1, wherein the effluent stream from the condensation step is, prior to passage of any portion thereof to the alkylation step, separated into an adduct-containing fraction and a normal mono-olefin-containing fraction and wherein the normal mono-olefin-containing fraction is passed to said alkylation step.

3. An improved process as defined in claim 1 wherein the entire effluent stream from the condensation step is passed directly to the alkylation step after removal of unreacted dienophilic compound.

4. An improved process as defined in claim 1 wherein said normal paraffin contains about 9 to about 20 carbon atoms per molecule.

5. An improved process as defined in claim 1 wherein said dienophilic compound is a mono-olefinic hydrocarbon containing 3 to 6 carbon atoms per molecule.

6. An improved process as defined in claim 5 wherein said mono-olefin is conjugated with at least 1 electron-attracting group.

7. An improved process as defined in claim 1 wherein said dienophilic compound is selected from the group consisting of: maleic anhydride, acrolein, cinnamaldehyde, crotonic acid, cinnamic acid, acrylic acid, acylonitrile, crotonaldehyde, quinone, tetracyanoethylene, and dimethylmaleate.

8. An improved process as defined in claim 1 wherein the condensation conditions utilized in said condensation step include a temperature in the range of about 25° C. to about 200° C.

9. An improved process as defined in claim 1 wherein the catalyst utilized in the dehydrogenation step is a combination of a platinum group metallic component, a component selected from the group consisting of alkali metals, alkaline earth metals, and compounds thereof and a component selected from the group consisting of arsenic, antimony, bismuth, and compounds thereof with an alumina carrier material.

10. An improved process as defined in claim 1 wherein said acid-acting alkylation catalyst is hydrogen fluoride.

11. An improved process as defined in claim 1 wherein said alkylatable aromatic hydrocarbon is benzene.

References Cited

UNITED STATES PATENTS

| | | | |
|---|---|---|---|
| 3,312,734 | 4/1967 | Jones | 260—677 |
| 3,347,948 | 10/1967 | Featherstone | 260—677 |

FOREIGN PATENTS

| | | |
|---|---|---|
| 950,975 | 3/1964 | Great Britain. |

DELBERT E. GANTZ, Primary Examiner

C. R. DAVIS, Assistant Examiner